April 14, 1970   A. A. BIRCH, JR   3,506,406
PORTABLE MEMBRANE BLOOD OXYGENATOR
Filed June 20, 1967   3 Sheets-Sheet 1

INVENTOR.
ALEXANDER A. BIRCH, JR.

BY

ATTORNEY

April 14, 1970  A. A. BIRCH, JR  3,506,406
PORTABLE MEMBRANE BLOOD OXYGENATOR
Filed June 20, 1967  3 Sheets-Sheet 2

INVENTOR.
ALEXANDER A. BIRCH, JR.
BY
ATTORNEY

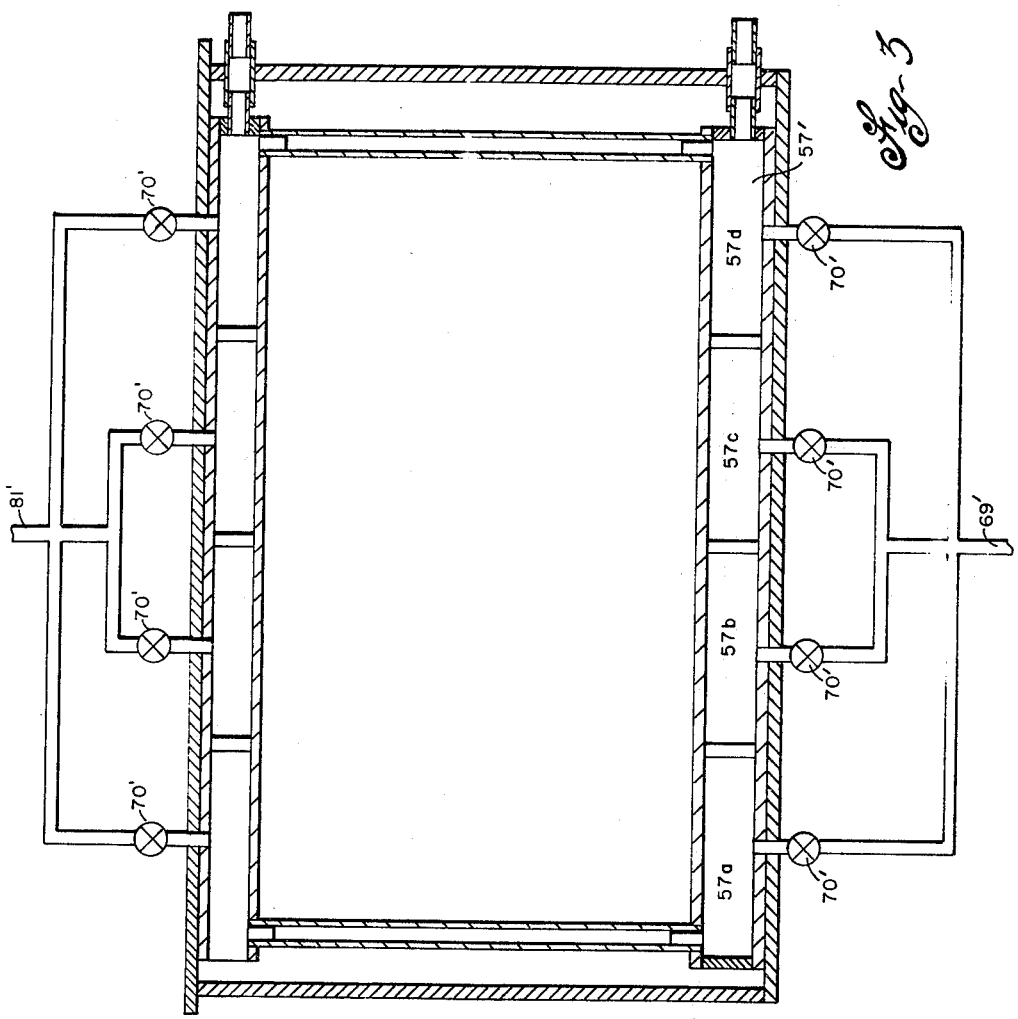

United States Patent Office
3,506,406
Patented Apr. 14, 1970

3,506,406
PORTABLE MEMBRANE BLOOD OXYGENATOR
Alexander A. Birch, Jr., 111 E. Valleybrook Road,
Cherry Hill, N.J. 08034
Filed June 20, 1967, Ser. No. 648,191
Int. Cl. A61m 1/03
U.S. Cl. 23—258.5  6 Claims

ABSTRACT OF THE DISCLOSURE

An improved blood oxygenator in which a fresh supply of oxygen is diffused through a plurality of tubular silastic membranes into contact with the extracorporeal blood circulating system. The oxygen supply means includes a nebulizing device to form an oxygen-water vapor environment which is brought into contact with the membranes; which device acts to control the temperature of the oxygenation environment and, thereby, improve the transfer of oxygen to the blood.

---

Although oxygenation of blood in the human lung occurs continuously without damage to the blood cells, use of various types of extracorporeal blood oxygenation devices in the past has been possible only for limited intervals of time without substantial harmful effect. Many presently used devices oxygenate the blood by means of a disk, foam, spray or bubble technique. In such devices, however, the oxygen directly contacts the blood and causes extensive blood cell damage by destroying the red blood cells and denaturing the blood protein. So called membrane oxygenators have also been used wherein the oxygen diffuses through a silastic membrane material so as to avoid direct oxygen-blood contact and destruction of the blood cells. Membrane oxygenators used heretofore, however, have been found to be expensive and complex in design, subject to failure due to membrane leakage and unable to provide a sufficient rate of oxygen transfer to the blood.

It is therefore a principal object of the invention to provide a novel and improved extracorporeal blood oxygenator in which the transfer of oxygen to the blood is substantially increased and improved.

It is a further object of the invention to provide a novel and improved blood oxygenator in which no extracorporeal blood pump is required.

It is a further object of the invention to provide a novel and improved membrane oxygenator wherein defective membranes of the oxygenator can be isolated from the extracorporeal blood circulatory system without materially disrupting the oxygenation operation.

It is a further object of the invention to provide a novel and improved blood oxygenator in which the oxygen transfer environment is maintained within a suitable preselected temperature range in a unique and improved manner.

Other objects and many of the attendant advantages of this invention will be readily appreciated as the same becomes better understood by reference to the following detailed description when considered in connection with the accompanying drawings wherein:

FIG. 3 is a cross-sectional view of the oxygenation chamber of another preferred embodiment of the invention.

Figure 1:
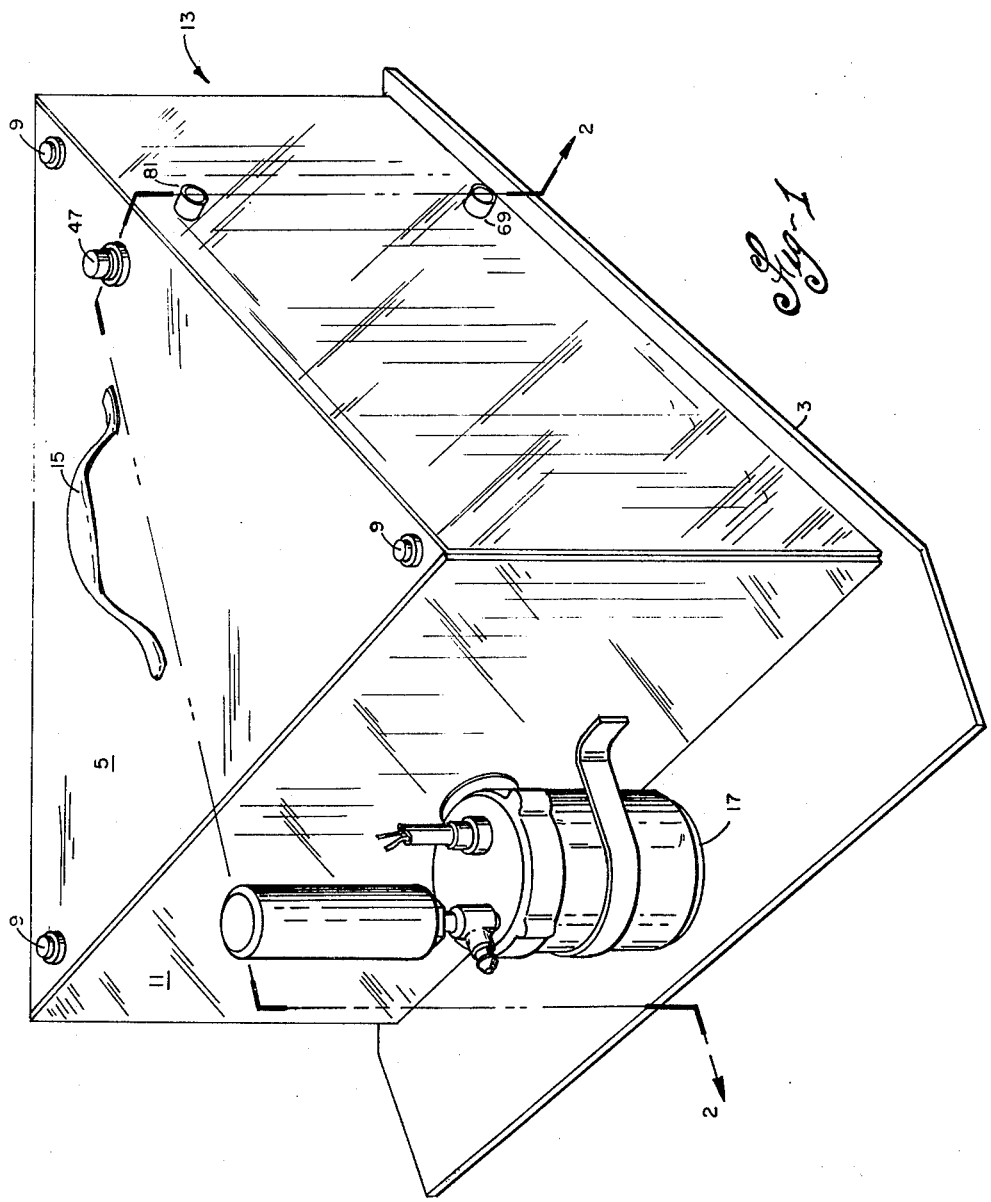
FIG. 1 is a perspective view of a preferred embodiment of the present invention.

Referring now to the various figures of the drawing, the improved oxygenator apparatus of the invention includes the generally triangularly shaped plexiglass base 3 and cover 5 which are positioned in a predetermined fixed spaced parallel relationship to one another by suitable tubular spacers 7 on the support posts or the like 9. Each of the rectangularly shaped plexiglass side walls 11 of the housing 13 are preferably removably secured to juxtaposed edges of the base 3 and the cover 5 in any suitable conventional manner to provide a relatively effective airtight enclosure therewithin. The carrying handle 15 is preferably affixed as shown to the cover of the housing 13 in any suitable manner and facilitates movement of the apparatus from place to place.

The oxygen nebulizing device 17 is positioned on an extended portion of the base 3 and is removably secured to the adjacent side wall of the housing in any suitable manner. Oxygen from a suitable source 19 is supplied to one arm of the nebulizer yoke 21 of the device 17 through the control valve 23 and the conduit 25. The other arm 27 of the nebulizer yoke 21 extends downwardly below the surface of the water in the nebulizer bottle or container 29. The common arm of the yoke 21 extends through the side wall of the housing 13 and terminates within its enclosure in a suitable nozzle device 31. The polyethylene filter 33 is positioned within the enclosure in parallelism with side wall 11 of the housing adjacent the end of the nebulizer nozzle 31. The conventional heating device 35 which is positioned in the cap of the nebulizing bottle 29 extends downwardly into the water in the bottle and is electrically energized by current flowing from the electrical power source 37 through the electrical switch 39 and the current control device 41.

Pressure of the oxygen environment within the enclosure is controlled by operation of the oxygen/carbon dioxide relief valve 43 which is positioned in the opening 45 in the cover 5 of the housing. The valve housing 47 is threadedly and adjustably positioned on the internally threaded boss 49 around the opening 45. As will be more apparent hereinafter, the nut 51 which is also threaded on the valve housing 47 locks the housing 47 in its preselected position once the desired oxygen pressure within the enclosure has been properly adjusted. The spring element 53 between the inner peripheral surface of the valve housing 47 and the relief valve 43 normally biases the valve toward its lowermost closed position in opening 45.

The blood circulatory system of the oxygenator includes upper and lower triangularly shaped manifolds 55 and 57 which are maintained in a predetermined fixed spaced parallel relationship by the tubular spacers 59 on the support posts 61. The lower manifold 57 includes upper and lower plexiglass panels 63 and 65 which are also maintained in a predetermined separated parallel relationship by suitable tubular spacers 66 on support posts 61. Plexiglass side walls are secured to the juxtaposed triangular edges of the panels 63 and 65 so as to form the triangular flat enclosure of the lower manifold. The manifold blood inlet conduit 67 extends from the interior of the manifold 57 through the side wall or the lower panel of the manifold to a point opposite the inner extremity of the similar blood inlet conduit 69 that extends through the side wall of the oxygen chamber housing 13. A suitable flexible conduit 71 interconnects juxtaposed ends of the conduits 67 and 69.

The upper manifold 55 also includes upper and lower plexiglass panels 73 and 75 which are maintained in a predetermined separated parallel relationship by the tubular spacers 77 on support posts 61. Plexiglass side walls are similarly secured to the juxtaposed triangular edges of the panels 73 and 75 so as to form the triangular flat enclosure of the upper manifold. The manifold blood outlet conduit 79 extends from the interior of the manifold 55 through the side wall or the upper panel 73 of the manifold to a point opposite the inner extremity of the similar blood outlet conduit 81 that extends through the side wall or cover 5 of the oxygen chamber housing 13. The flexible conduit 83 interconnects juxtaposed ends of the conduits 79 and 81.

A plurality of apertures are formed in the upper panel of manifold 57 and are aligned with similar apertures in the lower panel of manifold 55. Tubular fittings 85 which are affixed in the said apertures extend respectively upwardly and downwardly from the panel 75 and inwardly and upwardly from the panel 63. Opposite ends of silastic membranes 87 are positioned over and extend between opposed ends of the aligned tubular fittings. The membranes 87 are preferably formed from elongated rectangular strips of silastic material by overlapping and sealing opposite elongated edges of the strips. The resulting rough internal seal is intentionally provided for reasons which will be more apparent hereinafter. Dacron reinforced silastic strips with their rough surface characteristics are also preferably used in the construction of the membranes to further increase the general rough nature of the internal surface of the membranes. The internal diameter of each of the tubular membranes 87 is preferably approximately $\frac{1}{8}''$ so as to substantially reduce blood flow resistance through the system. In this way, use of an extracorporeal blood pump is not necessary.

Figure 2:
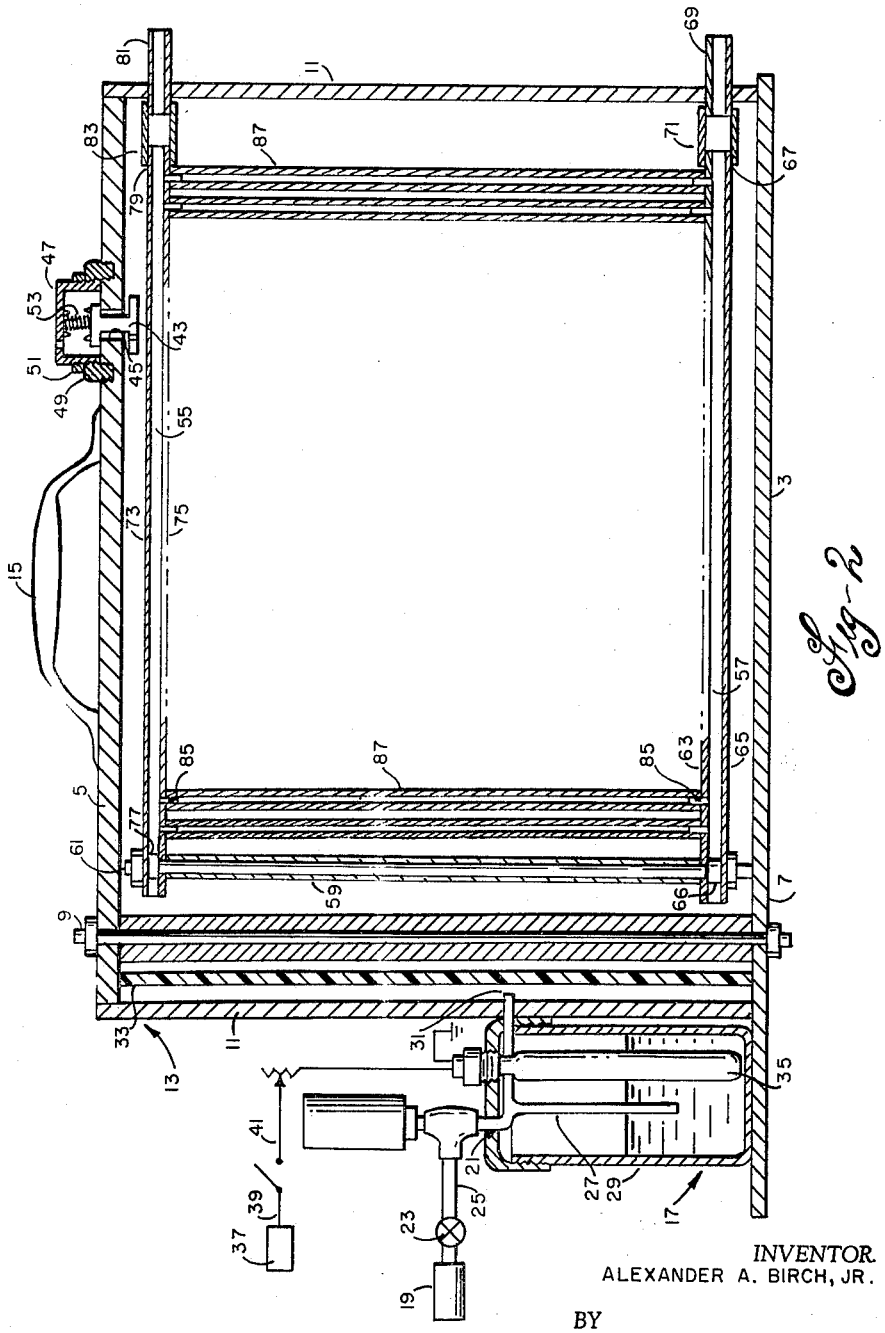
FIG. 2 is a cross-sectional view along reference line 2—2 of the embodiment of the invention shown in FIG. 1.

Referring now to FIG. 3 of the drawing, in accordance with another embodiment of the invention, it will be noted that the inlet manifold $57^1$ is subdivided into a plurality of sections, $57a$, $57b$, $57c$ and $57d$. Each section of the manifold $57^1$ is connected to the main blood inlet conduit $69^1$ through a branch conduit and control valve $70^1$. Otherwise, the apparatus of the embodiment of FIG. 3 is identical with that of FIGS. 1 and 2.

In operation, the manifolds 55 and 57, the silastic membranes 87, and the various blood inlet and outlet conduits are first primed with a suitable glucose water solution or with blood that matches that of the patient. The heating element 35 of the nebulizing device 17 is then energized by the switch 39 and the control unit 41 and the water in the container 29 is heated to a predetermined temperature. The oxygen supply control valve 23 is then opened and adjusted to direct the flow of oxygen into the housing 13 at a controlled rate. The oxygen in flowing through the nebulizer yoke 21 draws with it heated water from the container 29 and the resulting elevated temperature oxygen-water vapor mixture exits from the nozzle 31 into the housing 13. The flow of the oxygen-water vapor mixture through the polyethylene filter 33 thoroughly diffuses and distributes it throughout the entire interior of the housing 13. Adjustment of the locking nut 51 and the relief valve housing 47 on the main housing boss 49 provides control of the pressure of the oxygen-water vapor environment within the housing.

The blood inlet conduit 69 is then connected in any suitable conventional manner to a main artery of the patient and the blood outlet conduit 81 is similarly connected to a principal vein. The blood in circulating from the artery to the manifold 57 and upwardly through the silastic membranes 87 to the upper manifold 55 and back to the vein absorbs oxygen through the membranes and discharges carbon dioxide in the opposite direction into the housing 13. The roughness of the internal seams along the length of the membranes and/or the rough internal surface of the Dacron reinforced membranes thoroughly agitate the blood as it flows through the membranes and, in so doing, improves the rate of oxygen transfer through the membranes. In the modification of the invention shown in FIG. 3 of the drawing when one or more of the membranes become defective and permit direct contact of the blood with the oxygen, one or more of the control valves $70^1$ are closed so as to isolate the membranes in which the defective membranes are grouped from the rest of the oxygenation system.

Obviously, many modifications and variations of the present invention are possible in the light of the above teachings. It is therefore to be understod that within the scope of the appended claims, the invention may be practiced otherwise than as specifically described.

What is claimed is:
1. Blood oxygenating apparatus for a patient, said apparatus comprising:
   (a) a closed housing;
   (b) means for supplying oxygen to the interior of the housing, said means including a nebulizing device that mixes the incoming oxygen with water vapor preheated to a predetermined temperature to provide an oxygen-water vapor environment within the housing.
   (c) a plurality of tubular silastic membranes disposed within the housing;
   (d) and means for coursing blood of the patient under its own pressure from an artery through the tubular membranes to a vein.
2. The apparatus substantially as described in claim 1 wherein the oxygen supply means also includes a filtering device that diffuses the oxygen-water stream from the nebulizing device so as to distribute the oxygen-water environment uniformly throughout the housing.
3. The apparatus substantially as described in claim 1 wherein the tubular membranes are formed from a silastic impregnated Dacron mesh material that induces turbulence of the blood as it flows through the membrane.
4. The apparatus substantially as described in claim 1 wherein the means for coursing the blood through the tubular membranes includes:
   (a) a first manifold which receives the blood from the artery and conducts the blood into one end of each of the memranes;
   (b) and a second manifold which receives the blood from the other end of each of the membranes and retains the blood to the vein.
5. The apparatus substantially as described in claim 4 wherein the first manifold is subdivided into separate compartments and the blood is selectively directed through the said compartments.
6. The apparatus substantially as described in claim 4 wherein the blood passes from the first manifold through the membranes to the second manifold in a direction in opposition to the force of gravity.

References Cited
UNITED STATES PATENTS
2,972,349   2/1961   De Wall _____ 23—258.5

MORRIS O. WOLK, Primary Examiner

B. S. RICHMAN, Assistant Examiner

U.S. Cl. X.R.
210—321